(12) United States Patent
Nagasaka et al.

(10) Patent No.: US 6,621,176 B1
(45) Date of Patent: Sep. 16, 2003

(54) INPUT DEVICE FOR USE IN VEHICLES FOR INPUTTING SETTINGS PERTAINING TO DRIVER'S INTENTION OF ACCELERATION AND DECELERATION

(75) Inventors: Chikao Nagasaka, Aichi-ken (JP); Yoshihiro Ohkura, Aichi-ken (JP); Hiroshi Tsuge, Aichi-ken (JP); Toru Nakamura, Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 148 days.

(21) Appl. No.: 09/649,968

(22) Filed: Aug. 28, 2000

(30) Foreign Application Priority Data

Sep. 3, 1999 (JP) .......................................... 11-249988

(51) Int. Cl.⁷ .................................................. B60L 1/00
(52) U.S. Cl. .................. 307/9.1; 74/473.18; 200/61.91; 701/52
(58) Field of Search ................................ 307/9.1, 10.1, 307/112, 113, 115, 125, 139; 200/5 R, 5 A, 5 D, 5 EA, 175, 176, 179, 61.28, 61.46, 61.91; 701/51, 52, 53, 58, 62; 180/170; 74/473.18

(56) References Cited

U.S. PATENT DOCUMENTS

| | | | | | |
|---|---|---|---|---|---|
| 4,180,713 | A | * | 12/1979 | Gonzales ..................... | 180/333 |
| 5,315,900 | A | * | 5/1994 | Teeter ......................... | 123/322 |
| 5,335,743 | A | * | 8/1994 | Gillbrand et al. ........... | 180/170 |
| 5,890,991 | A | * | 4/1999 | Sakakiyama ................. | 477/46 |
| 5,906,560 | A | * | 5/1999 | Minowa et al. .............. | 477/97 |
| 5,906,645 | A | * | 5/1999 | Kagawa et al. .............. | 180/167 |
| 6,076,622 | A | * | 6/2000 | Chakraborty et al. ........ | 180/169 |
| 6,085,137 | A | * | 7/2000 | Aruga et al. ................. | 477/120 |
| 6,185,499 | B1 | * | 2/2001 | Kinoshita et al. ........... | 180/179 |
| 6,203,469 | B1 | * | 3/2001 | Fujinuma ................... | 200/61.27 |
| 6,250,173 | B1 | * | 6/2001 | Huston ........................ | 74/489 |
| 6,260,432 | B1 | * | 7/2001 | Ehrmaier et al. ........ | 74/473.18 |

FOREIGN PATENT DOCUMENTS

JP          10-196780 A   *   7/1998

OTHER PUBLICATIONS

English Translation of Unexamined Patent Application, JP–106780–A. Publshed Jul. 31, 1998.*
Motor Vehicle Cruise Control System Operating Method, Abstract of US5,775,451, Published Jul. 7, 1998.*
Design News, Beyond Brake Control, Karen Auguston Field, Published Nov. 16, 1998.*
Mechanical Engineering, Smart Cruise Control, Author unknown, Published Jan. 1994.*

* cited by examiner

Primary Examiner—Brian Sircus
Assistant Examiner—Sharon A. Polk
(74) Attorney, Agent, or Firm—Nixon Peabody LLP; Thomas W. Cole

(57) ABSTRACT

An input device for use in a vehicle for inputting settings pertaining to a driver's intention of acceleration and deceleration includes a running mode selection switch and an acceleration/deceleration switch. A plurality of modes, for example, a manual speed change mode, an automatic speed change mode, a speed setting mode, and a distance-between-cars setting mode, are selectively set in the running mode selection switch. The acceleration/deceleration switch allows an accelerating or decelerating operation in correspondence to the selected mode. Operation switches which have been conventionally provided separately for each of functions are integrated into two parts, that is, the running mode selection switch and the acceleration/deceleration switch. After a desired mode has been selected, a desired function can be realized only by operation corresponding to a driver's intention of acceleration or deceleration. Accordingly, even if the driver is not experienced in using a plurality of functions, more reasonable operation suited for human perception and reaction allows the driver to become easily accustomed to use the device.

18 Claims, 8 Drawing Sheets

F I G. 4 A
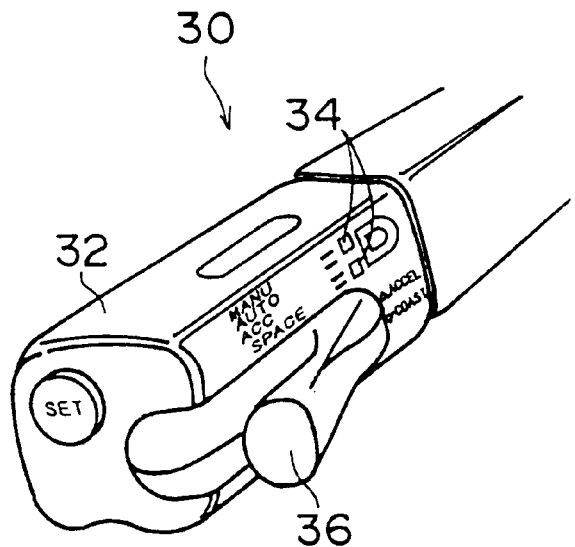
F I G. 4 B
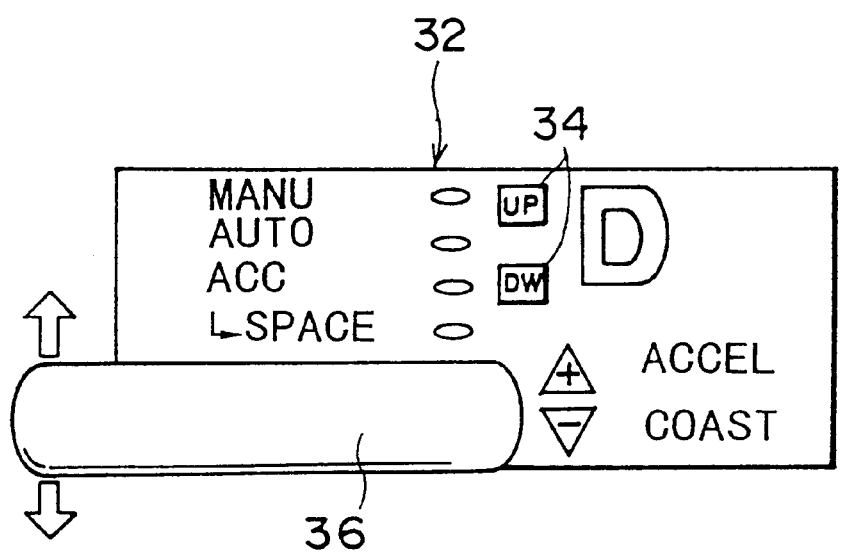

INPUT DEVICE FOR USE IN VEHICLES FOR INPUTTING SETTINGS PERTAINING TO DRIVER'S INTENTION OF ACCELERATION AND DECELERATION

BACKGROUND OF THE INVENTION

1. Field of the Invention

The present invention relates to an input device for use in a vehicle for inputting settings pertaining to an intention of acceleration and deceleration, which is operated by a driver so as to change a running state of a vehicle such as an automobile.

2. Description of the Related Art

Recently, in vehicles such as automobiles, as various functions have been required with the advance of functions for controlling a running state of a vehicle, the number of operation switches corresponding to such functions has been increased. However, a configuration space in which a large number of operation switches set corresponding to the various functions are disposed is limited in the interior of a vehicle. Therefore, the more operation switches are, the worse visibility and maneuverability of the switches become and the more knowledge a driver is required to have knowledge about functions and names of switches so as to get accustomed to use the switches.

Further, various normal operation switches for a vehicle are located at a position in which the switches are easily recognized by a driver, and within easy reach of the driver. Accordingly, for example, even if a certain conventional shift lever device has an operation switch which practically can be operated only at a specified shift position, the driver may have the illusion that the switch can apparently be operated at other shift positions resulting from that the switch is positioned so as to be recognizable and touchable by the driver. That is, such conventional switches may hinder proper understandings of functions due to such perceptively unreasonable arrangement of switches, thereby making it impossible for the driver to distinctly understand a function which is operable at the present time.

Moreover, in regard to a driver's intention for the running speed of a vehicle (that is, a driver's decision to accelerate or decelerate, or run a vehicle at constant speed), conventional design of operation switches has no consideration for reasonable configuration suited for human perception and reaction in arrangement of plural related switches or in setting of an operating direction of each switch.

SUMMARY OF THE INVENTION

The present invention has been devised in view of the above-described facts. An object of the present invention is to provide an input device for use in a vehicle for inputting settings pertaining to a driver's intention of acceleration and deceleration, in which visibility and maneuverability of operation switches are further improved as compared with conventional type operation switches, a driver is more easily accustomed to use each of functions (corresponding to the operation switches), and a function corresponding to an operation based on a driver's intention in regard to a vehicle running speed of a driver's desire can be realized.

Another object of the present invention is to provide an input device for use in a vehicle for inputting settings pertaining to a driver's intention of acceleration and deceleration, in which a function (operation switch) which is operable at present is easy to distinctly understand and a driver gets more easily accustomed to use the device.

Still another object of the present invention is to provide an input device for use in a vehicle for inputting settings pertaining to a driver's intention of acceleration and deceleration, in which arrangement of plural related operation switches or operating directions of the switches, corresponding to a driver's intention in regard to a vehicle running speed (that is, a driver's decision to accelerate or decelerate, or run a vehicle at a constant speed), is set naturally for human perception and the switches can be used more easily.

In accordance with a first aspect of the present invention, there is provided an input device for use in a vehicle for inputting settings pertaining to an intention of acceleration and deceleration, the input device comprising: a running mode selection switch for selecting any one of a manual speed change mode which allows manual shifting to a transmission gear, and a speed setting mode which allows cruising at a selected speed; and an acceleration/deceleration switch which can select a transmission gear in the manual speed change mode and which allows acceleration and deceleration in the speed setting mode.

In the input device for use in a vehicle for inputting settings pertaining to an intention of acceleration and deceleration in accordance with the first aspect, two running modes, that is, the manual speed change mode and the speed setting mode can be selected by the running mode selection switch. Further, in each of the selected running modes, a desired function can be realized only by operation corresponding to a driver's intention of "acceleration" or "deceleration" using the acceleration/deceleration switch.

Namely, in the input device for use in a vehicle for inputting settings pertaining to an intention of acceleration and deceleration in accordance with the first aspect, various operation switches, which have been conventionally provided separately for "acceleration" or "deceleration" in different running states are integrated into two parts, that is, the running mode selection switch and the acceleration/deceleration switch. Accordingly, a desired function can be realized only by operation corresponding to a driver's intention of acceleration and deceleration and these switches are improved in visibility and maneuverability as compared with conventional switches. Therefore, the driver becomes easily accustomed to use each of functions (corresponding to the operation switches).

In accordance with a second aspect of the present invention, there is provided an input device for use in a vehicle for inputting settings pertaining to an intention of acceleration and deceleration, the input device comprising: a running mode selection switch for selecting any one of a manual speed change mode which allows manual shifting to a transmission gear, an automatic speed change mode which allows automatic setting of a transmission shifting pattern, a speed setting mode which allows cruising while maintaining a selected speed, and a distance-between-cars setting mode which causes a vehicle to maintain a predefined distance from an adjacent car; and an acceleration/deceleration switch in which a transmission gear can be selected in the manual speed change mode, a transmission shift pattern can be selected in the automatic speed change mode, acceleration and deceleration is possible in the speed setting mode, and the predefined distance from an adjacent car can be increased and decreased in the distance-between-cars setting mode, wherein the running mode selection switch and the acceleration/deceleration switch are disposed in close vicinity to each other.

In the input device for use in a vehicle for inputting settings pertaining to an intention of acceleration and deceleration in accordance with the second aspect, four running modes, that is, the manual speed change mode, the automatic speed change mode, the speed setting mode, and the distance-between-cars setting mode can each be selected by the running mode selection switch. Further, in each of the selected running modes, a desired function can be realized only by operation corresponding to a driver's intention of "acceleration" or "deceleration" using the acceleration/deceleration switch.

Namely, in the input device for use in a vehicle for inputting settings pertaining to an intention of acceleration and deceleration in accordance with the second aspect, various operation switches, which have been conventionally provided separately for "acceleration" or "deceleration" in different running states are integrated into two parts, that is, the running mode selection switch and the acceleration/deceleration switch. Accordingly, a desired function can be realized only by operation corresponding to a driver's intention of acceleration and deceleration, and visibility and maneuverability of the switches are improved. Therefore, the driver becomes easily accustomed to use each of functions (corresponding to the operation switches).

In accordance with a third aspect of the present invention, there is provided an input device for use in a vehicle for inputting settings pertaining to an intention of acceleration and deceleration, the input device comprising: a shift switch in which a forward shift position for selecting a forward transmission setting, a rearward shift position for selecting a reverse transmission setting, and a neutral or parking shift position are provided; a running mode selection switch for selecting any one of a manual speed change mode which allows manual shifting to a transmission gear, an automatic speed change mode which allows automatic setting of a transmission shifting pattern, a speed setting mode which allows cruising while maintaining a selected speed, and a distance-between-cars setting mode which causes a vehicle to maintain a predefined distance form an adjacent car; and an acceleration/deceleration switch in which a transmission gear can be selected in the manual speed change mode, a transmission shift pattern can be selected in the automatic speed change mode, acceleration and deceleration is possible in the speed setting mode, and the predefined distance from an adjacent car can be increased and decreased in the distance-between-cars setting mode, wherein the running mode selection switch and the acceleration/deceleration switch are formed integrally with the shift switch and disposed in close vicinity to each other at a position in which the running mode selection switch and the acceleration/deceleration switch is visually recognizable only when the shift switch is selected at the forward shift position, and an ignition switch is formed integrally with the shift switch at a position in which the ignition switch is visually recognizable only when the shift switch is selected at the neutral or parking shift position.

In the input device for use in a vehicle for inputting an intention of acceleration and deceleration in accordance with the third aspect, four running modes, that is, the manual speed change mode, the automatic speed change mode, the speed setting mode, and the distance-between-cars setting mode can each be selected by the running mode selection switch. Further, in each of the selected running modes, a desired function can be realized only by operation corresponding to a driver's intention of "acceleration" or "deceleration" using the acceleration/deceleration switch.

Furthermore, in this case, the running mode selection switch and the acceleration/deceleration switch are formed integrally with the shift switch and disposed in close vicinity to each other at a position in which the running mode selection switch and the acceleration/deceleration switch is visually recognizable only when the shift switch is selected at the forward shift position. The ignition switch is formed integrally with the shift switch at a position in which the ignition switch can be visually recognized only when the shift switch is selected at the neutral or parking shift position. That is, a function which is operable at a present shift position can be recognized based on a determination as to whether the above-described operation switches (the running mode selection switch and the acceleration/deceleration switch, or the ignition switch) can be visually recognized.

Accordingly, the function (operation switch) which is operable at the present time is clearly recognizable and is understandable, and therefore, the driver becomes easily accustomed to use the device.

In accordance with a fourth aspect of the present invention, there is provided an input device for use in a vehicle for inputting settings pertaining to an intention of acceleration and deceleration, the input device comprising: a shift lever in which a forward shift position for selecting a forward transmission gear, a rearward shift position for selecting a reverse transmission gear, and a neutral or parking shift position are provided; and an acceleration/deceleration switch disposed in close vicinity to the shift lever and including, when the shift lever is selected at the forward shift position, an acceleration position for an acceleration operation and a deceleration position for a deceleration operation, wherein the forward shift position of the shift lever is provided nearer the front side of a vehicle than the neutral shift position and the rearward shift position is provided nearer the rear side of the vehicle than the neutral shift position, and the acceleration position of the acceleration/deceleration switch is provided further towards the front side of the vehicle than the deceleration position.

In the input device for use in a vehicle for inputting settings pertaining to an intention of acceleration and deceleration in accordance with the fourth aspect, the forward shift position of the shift lever is provided nearer the front side of the vehicle than the neutral shift position and the rearward shift position of the shift lever is provided nearer the rear side of the vehicle than the neutral shift position. Moreover, the acceleration position of the acceleration/deceleration button is provided further at the front side of the vehicle than the deceleration position. That is, the operating directions of the acceleration/deceleration button (switch) corresponding to a driver's intention in regard to acceleration and deceleration of the vehicle (that is, a driver's decision to accelerate or decelerate, or run the vehicle at constant rate) becomes more reasonable so as to be suited for human perception and reaction, and the driver becomes easily accustomed to use the device.

BRIEF DESCRIPTION OF THE DRAWINGS

FIGS. 4A and 4B each show the second embodiment of an input device for use in a vehicle for inputting settings pertaining to a driver's intention of acceleration and deceleration according to the present invention: FIG. 4A is a perspective view showing a state in which a shift switch is selectively set at a forward shift position (D position); and FIG. 4B is a front view showing structures of a running mode selection switch and an acceleration/deceleration switch, which are provided in the shift switch.

FIG. 5A is a perspective view showing a state in which the shift switch is selectively set at a neutral or parking shift position (N/P position); and FIG. 5B is a front view showing a structure of an ignition switch provided in the shift switch.

DESCRIPTION OF THE PREFERRED EMBODIMENTS

Figure 1:
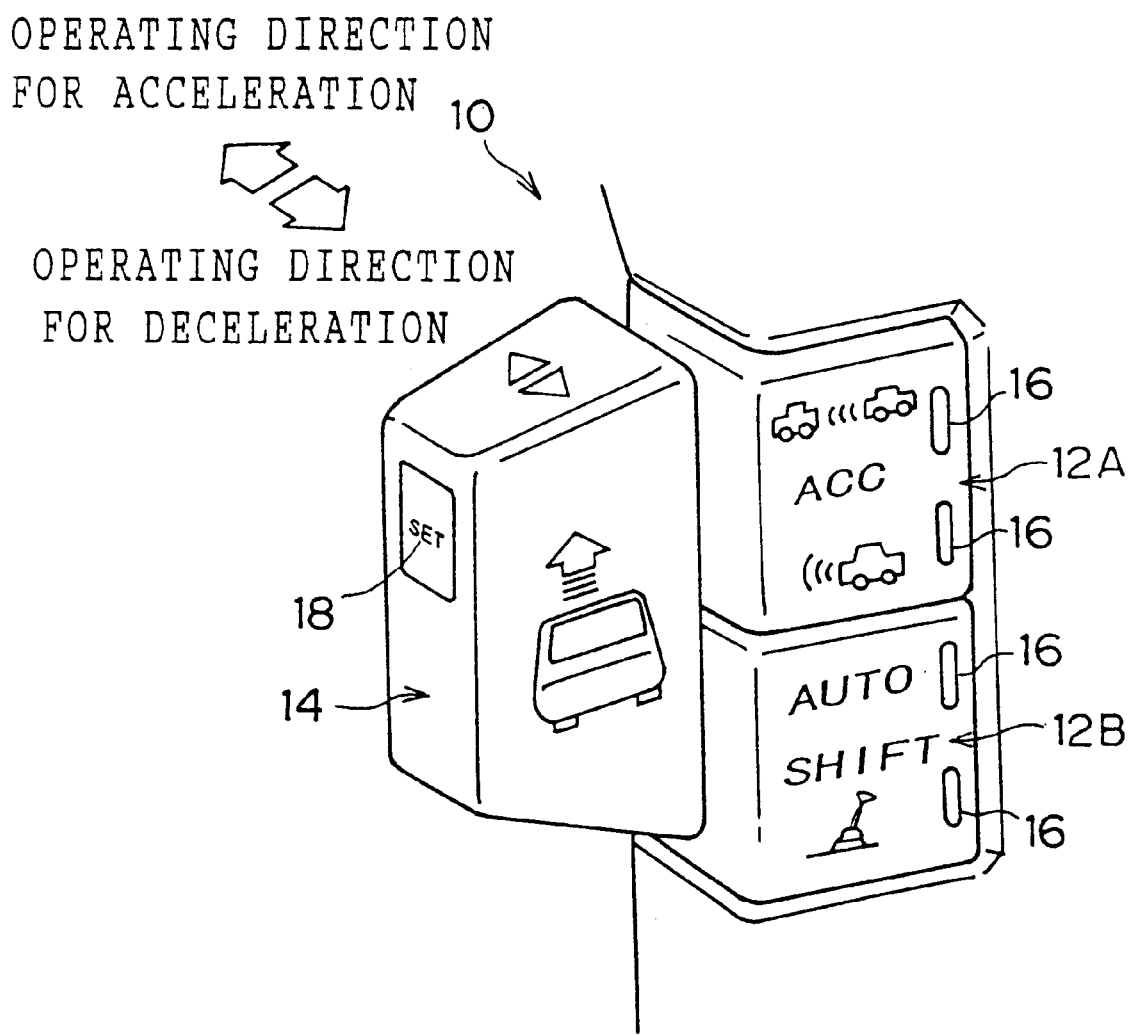
FIG. 1 is a perspective view showing overall construction of a first embodiment of an input device for use in a vehicle for inputting settings pertaining to a driver's intention of acceleration and deceleration according to the present invention.

FIG. 1 shows a perspective view of overall construction of a first embodiment of an input device 10 for use in a vehicle for inputting settings pertaining to a driver's intention of acceleration and deceleration according to the present invention.

The input device 10 for use in a vehicle for inputting settings pertaining to a driver's intention of acceleration and deceleration includes running mode selection switches 12A and 12B disposed adjacent to each other, and an acceleration/deceleration switch 14. The running mode selection switches 12A and 12B are formed as a pair of push switches disposed respectively at upper and lower sides. The lower running mode selection switch 12B allows switching between a manual speed change operation which allows setting of a transmission gear by a manual shift operation, and an automatic speed change operation which allows automatic setting of a speed change pattern of the transmission. The upper running mode selection switch 12A allows, when the automatic speed change mode is selected, switching between a speed setting mode which allows cruising while maintaining a predefined speed, and a distance-between-cars setting mode which allows running while maintaining a distance between adjacent cars.

The running mode selection switches 12A and 12B for selecting these modes are provided with indicator lamps 16 corresponding to the manual transmission mode, the automatic speed change mode, the speed setting mode, and the distance-between-cars setting mode. When each of the modes is selected, the indicator lamp 16 corresponding to the selected mode is turned on.

On the other hand, the acceleration/deceleration switch 14 is disposed adjacent to the running mode selection switches 12A and 12B, and allows acceleration/deceleration operation corresponding to the mode selected by the running mode selection switches 12A and 12B.

That is, when the manual speed change mode is selected by the running mode selection switch 12B, a transmission gear can be manually selected. In this case, an operating direction for acceleration is set so as to be the forward direction of a vehicle and an operating direction for deceleration is set so as to be the rearward direction of the vehicle. That is, in order that an engine brake be applied, so long as the switch 14 is operated in the operating direction for deceleration, that is, toward the rear side of the vehicle (in a direction to which the device 10 is pulled by a driver), downshift is performed, for example, "from fourth gear speed to third gear speed", or "from third gear speed to second gear speed". On the other hand, in order that the engine brake be released, so long as the switch 14 is operated in the operating direction for acceleration, that is, toward the front side of the vehicle (in a direction to which the device 10 is pushed by a driver, shifting to a high gear is performed.

Further, when the automatic speed change mode is selected by the running mode selection switch 12B, a shift pattern of the transmission can be selected. That is, in order that the vehicle runs fast, an operation showing a tendency toward acceleration, for example, a "sports shift pattern" can be selected. When it is not particularly necessary to run the vehicle fast, a "normal shift pattern" can be selected. In this case as well, an operating direction for acceleration is set at a position near the front side of the vehicle and an operating direction for deceleration is set at a position near the rear side of the vehicle.

When the speed setting mode is selected by the running mode selection switch 12A, acceleration and deceleration of the vehicle is allowed. That is, when the speed setting mode is selected by the running mode selection switch 12A, a vehicle running speed at the present time is stored and displayed by operating an SET switch 18 provided in the acceleration/deceleration switch 14, and a throttle actuator is controlled so as to maintain a predefined speed. Further, in order that the predefined speed be increased, a predefined speed indication increases by performing an operation for acceleration. When the accelerating operation is completed at the time of arrival at a desired speed, an indicated speed at this time is stored as a new predefined speed. Subsequently, the running speed is controlled with respect to the predefined speed. In order that the predefined speed be decreased, the predefined speed indication decreases by effecting an operation for deceleration. When the decelerating operation is completed at the time of arrival at a desired speed, an indicated speed at this time is stored as a new predefined speed. Subsequently, the running speed is controlled with respect to the predefined speed. In the speed setting mode as well, the operating direction for acceleration is set near the front side of the vehicle and the operating direction for deceleration is set near the rear side of the vehicle.

Moreover, when the distance-between-cars setting mode is selected by the running mode selection switch 12A, the distance between cars can be increased and decreased. That is, in order that the distance from an adjacent car be reduced, an indication of the predefined distance from an adjacent car is decreased by effecting the operation for acceleration. When the acceleration operation is completed at the time of arrival at a desired distance from an adjacent car, a distance between cars indicated at this time is stored as a new predefined distance between cars. Subsequently, the distance from an adjacent car is controlled with respect to the predefined distance between cars thus reduced. In order that the distance from an adjacent car be widened, an indication of the predefined distance from an adjacent car is increased by effecting the operation for deceleration. When the deceleration operation is completed at the time of arrival at a desired distance from an adjacent car, a distance between cars indicated at this time is stored as a new predefined distance from an adjacent car. Subsequently, the distance from an adjacent car is controlled with respect to the predefined distance between cars thus widened. In the distance-between-cars setting mode as well, the operating direction for acceleration is set so as to be the forward direction of the vehicle and the operating direction for deceleration is set so as to be the rearward direction of the vehicle.

In the input device 10 for inputting settings pertaining to an intention of acceleration and deceleration having the above-described structure, the four running modes, that is, the manual speed change mode, the automatic speed change mode, the speed setting mode, and the distance-between-cars setting mode can be selected by the running mode selection switches 12A and 12B. Further, in each of the selected running modes, each function can be realized only by operation corresponding to a driver's intention of "acceleration" or "deceleration" using the acceleration/deceleration switch 14.

Namely, in the input device 10 for inputting settings pertaining to an intention of acceleration and deceleration according to the present embodiment, various operation switches, which have been conventionally provided separately for "acceleration" or "deceleration" in different running states are integrated into two parts, that is, the running mode selection switches 12A and 12B; and the acceleration/deceleration switch 14. Accordingly, after a desired mode has been selected, the function in the mode can be realized only by operation corresponding to a driver's intention of acceleration and deceleration. No special knowledge about the operation is required and the driver becomes easily accustomed to use each of functions (operation switches). Further, conventional unreasonable ordering of priority in the arrangement of operation switches, such as a determination as to which switch is located at a position having the best maneuverability among operation switches separately provided, is not necessary. All of functions (operation switches) can be located at a position having the best maneuverability (for example, at a steering pad which can; be operated while holding a steering wheel).

Further, in the input device 10 for inputting settings pertaining to an intention of acceleration and deceleration, the operating direction for acceleration in the acceleration/deceleration switch 14 is set so as to be the forward direction of the vehicle and the operating direction for deceleration is set so as to be the rearward direction of the vehicle. That is, the operating directions of the acceleration/deceleration switch 14 corresponding to a driver's intention in regard to acceleration and deceleration (that is, a driver's decision to accelerate or decelerate, or run a vehicle at constant rate) becomes reasonable so as to be suited for human perception and reaction and the driver becomes more easily accustomed to use the switch.

In order to allow a driver to receive and recognize respective names of proper functions in the four running modes: the manual speed change mode; the automatic speed change mode; the speed setting mode; and the distance-between-cars setting mode, these names may each be displayed on a display which is separately provided.

Figure 2:
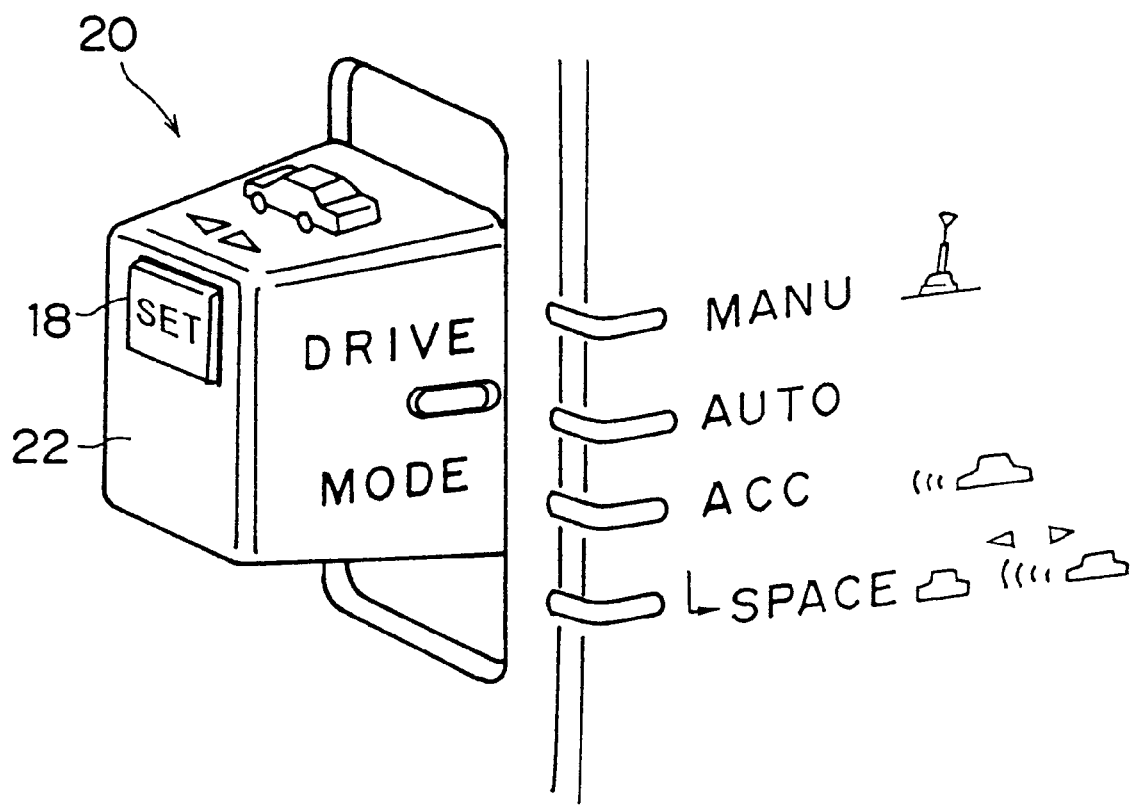
FIG. 2 is a perspective view showing a modified example of the first embodiment of an input device for use in a vehicle for inputting settings pertaining to a driver's intention of acceleration and deceleration according to the present invention.

The above-described first embodiment has the structure in which the input device 10 for inputting settings pertaining to an intention of acceleration and deceleration is formed by the running mode selection switches 12A and 12B and the acceleration/deceleration switch 14. However, the running mode selection switches 12A and 12B and the acceleration/deceleration switch 14 can be integrated by a single operation switch. Namely, as in an input device 20 of an intention of acceleration and deceleration shown in FIG. 2, a structure may be provided in which one of the four running modes: the manual speed change mode; the automatic speed change mode; the speed setting mode; and the distance-between-cars setting mode, is selected by operating to move a single operation switch 22 in vertical directions, and an accelerating or decelerating operation is performed corresponding to each of the modes by operating to move the operation switch 22 in forward and rearward directions of the vehicle.

In this case as well, after a desired mode has been selected, the function in the selected mode can be realized only by operation corresponding to a driver's intention of acceleration and deceleration. No special knowledge about the operation is required and the driver becomes easily accustomed to use each of functions (operation switches). Further, the operating directions of the operation switch 22 (that is, forward and rearward directions of the vehicle) corresponding to a driver's intention in regard to acceleration and deceleration (that is, a driver's decision to accelerate or decelerate, or run a vehicle at constant rate) becomes more reasonable so as to be suited for human perception and reaction, and the driver becomes more easily accustomed to use the operation switch 22.

Figure 3:
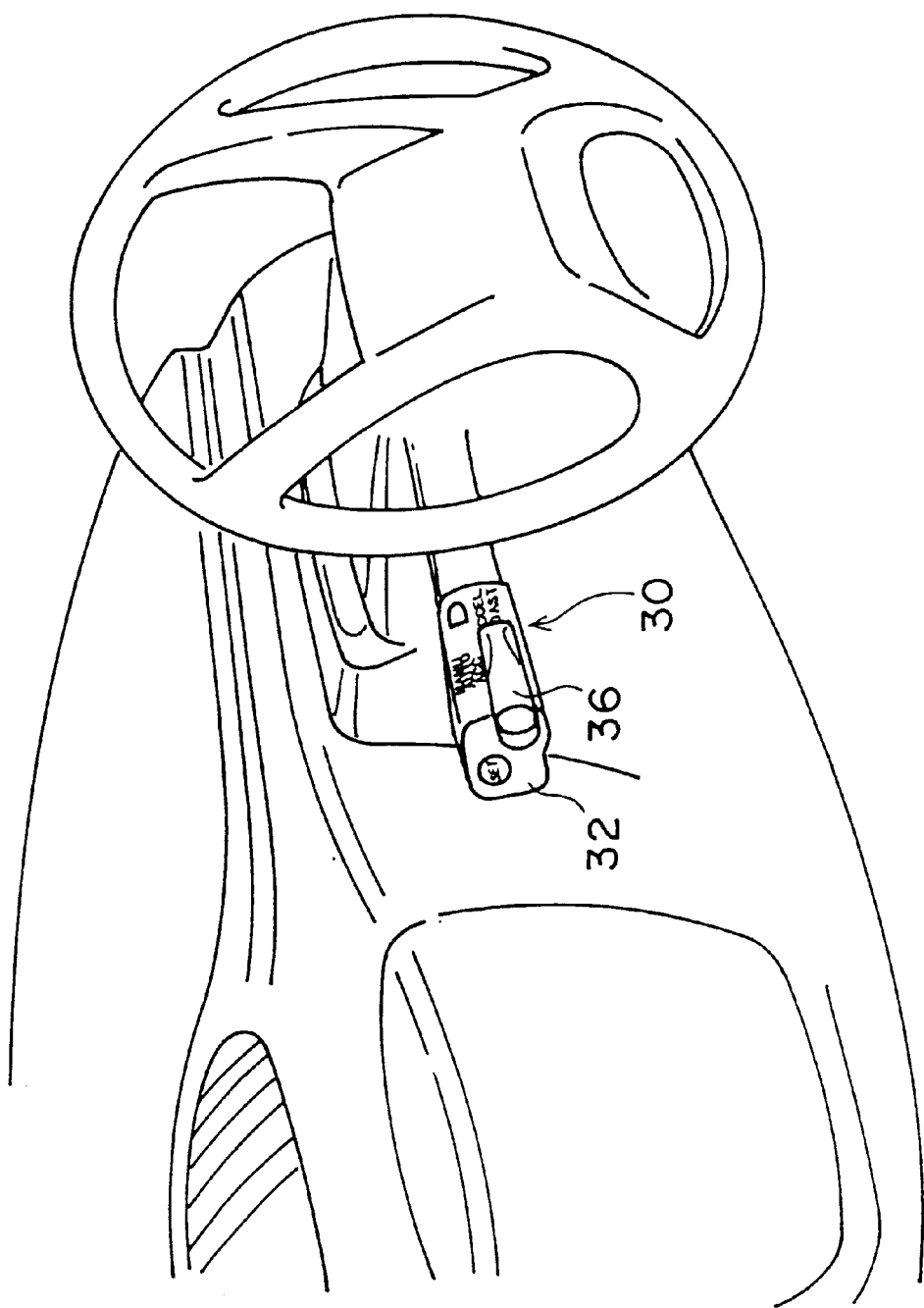
FIG. 3 is a perspective view showing overall construction of second embodiment of an input device for use in a vehicle for inputting settings pertaining to a driver's intention of acceleration and deceleration according to the present invention.

Next, FIG. 3 is a perspective view of overall construction of a second embodiment of an input device 30 for inputting settings pertaining to an intention of acceleration and deceleration according to the present invention.

The input device 30 for inputting settings pertaining to an intention of acceleration and deceleration is provided with a so-called columnar type shift switch 32. Due to a rotating operation of the shift switch 32, a forward shift position (D position) for a forward transmission setting, a neutral or parking shift position (N/P position), and a rearward shift position (R position) for a reverse transmission setting can each be selected.

As is in detail illustrated in FIGS. 4A and 4B, the shift switch 32 includes a running mode selection switch 34 and an acceleration/deceleration switch 36. The running mode selection switch 34 allows, as in the above-described first embodiment, selection of the manual speed change mode, the automatic speed change mode, the speed setting mode, and the distance-between-cars mode. The acceleration/deceleration switch 36 allows, as in the above-described first embodiment, an accelerating or decelerating operation corresponding to each of the modes selected by the running mode selection switch 34. That is, a transmission gear can be selected in the manual speed change mode, a shift pattern of the transmission can be selected in the automatic speed change mode, acceleration or deceleration is allowed in the speed setting mode, and the distance from an adjacent car can be increased or decreased in the distance-between-cars setting mode.

In this case, the running mode selection switch 34 and the acceleration/deceleration switch 36 are formed integrally with the shift switch 32 and disposed adjacent to each other at a position in which they can be visually recognized only when the shift switch 32 is selected at the forward shift position (D position). Accordingly, for example, when the shift switch 32 is selected at the neutral or parking shift position (N/P position) or at the rearward shift position (R position), the driver is not allowed to visually recognize the running mode selection switch 34 and the acceleration/deceleration switch 36.

Figure 5A:
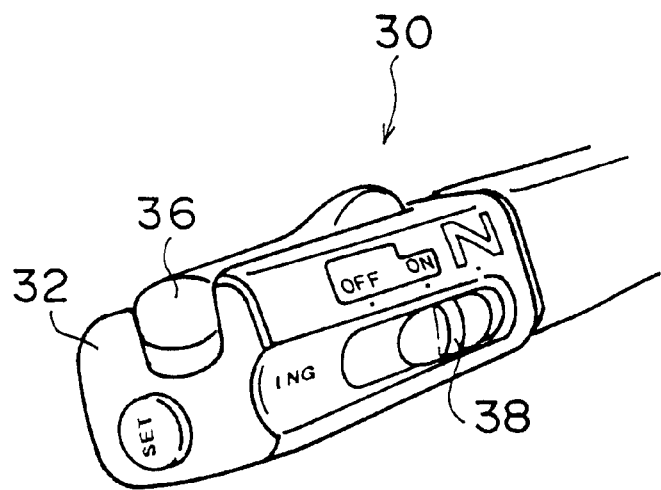
FIGS. 5A and 5B each show the second embodiment of an input device for use in a vehicle for inputting settings pertaining to a driver's intention of acceleration and deceleration according to the present invention.
Figure 5B:
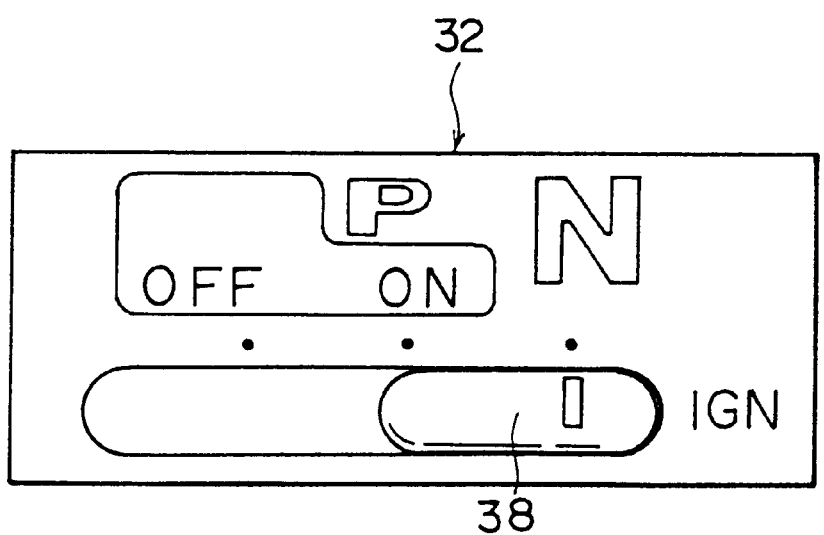

Further, as is illustrated in FIGS. 5A and 5B, an ignition switch 38 is formed integrally with the shift switch 32 at a position in which the ignition switch can be visually recognized only when the shift switch 32 is selected at the neutral or parking position (N/P position). Accordingly, for example, when the shift switch 32 is selected at the forward shift position (D position) or at the rearward shift position (R position), the driver is not allowed to visually recognize the ignition switch 38.

In the input device 30 for inputting settings pertaining to an intention of acceleration and deceleration having the above-described structure, due to the rotating operation of the shift switch 32, any one of the forward shift position (D position), the neutral or parking shift position (N/P position), and the rearward shift position (R position) can be selected.

When the forward shift position (D position) is selected by the shift switch 32, any one of the four running modes, that is, the manual speed change mode, automatic speed change mode, speed setting mode, or distance-between-cars setting mode can be selected. In each of the selected running modes, a function in the mode can be realized only by operation corresponding to an intention of "acceleration" or "deceleration" using the acceleration/deceleration switch 36. On the other hand, when the neutral or parking shift position (N/P position) is selected by the shift switch 32, the ignition switch 38 can be operated. In other words, the ignition switch 38 cannot be operated at other shift positions than the neutral or parking shift position (N/P position), and starting of an engine can be performed only at the neutral or parking shift position (N/P position).

Thus, in the input device 30 for inputting settings pertaining to an intention of acceleration and deceleration according to the second embodiment, various operation switches, which have been conventionally provided separately for "acceleration" or "deceleration" in different running states are integrated into two parts, that is, the running mode selection switch 34 and the acceleration/deceleration switch 36. Accordingly, after the desired mode has been selected, the function in the selected mode can be realized only by operation corresponding to a driver's intention of acceleration and deceleration. No special knowledge about each function for the operation is not necessary, and therefore, the driver becomes easily accustomed to use each of functions (operation switches). Further, conventional unreasonable ordering of priority in the arrangement of operation switches, such as a determination as to which switch is located at a position having the best maneuverability among operation switches separately provided, is not necessary. All of functions (that is, operation switches corresponding thereto) can be located at a position having the best maneuverability (for example, at a position in which they can be operated while holding a steering wheel).

In the input device 30 for inputting settings pertaining to an intention of acceleration and deceleration, the running mode selection switch 34 and the acceleration/deceleration switch 36 are formed integrally with the shift switch 32 at a position in which they are visually recognizable only when the shift switch 32 is selected at the forward shift position (D position). Further, the ignition switch 38 is formed integrally with the shift switch 32 at a position in which the ignition switch is visually recognizable only when the shift switch 32 is selected at the neutral or parking shift position (N/P position). That is, a function which is operable at a present shift position is recognizable based on a determination as to whether the above-described operation switches (the running mode selection switch 34 and the acceleration/deceleration switch 36, or the ignition switch 38) is visually recognizable.

Accordingly, the function (operation switch) which is operable at the present time is clearly recognizable and is understandable, and therefore, the driver becomes easily accustomed to use the device.

In the input device 30 for inputting settings pertaining to an intention of acceleration and deceleration according to the second embodiment as well, when the driver is allowed to receive and recognize respective names of proper functions in the four running modes, that is, the manual speed change mode, the automatic speed change mode, the speed setting mode, and the distance-between-cars setting mode, these names may each be displayed on a display (not shown) which is separately provided.

Figure 6:
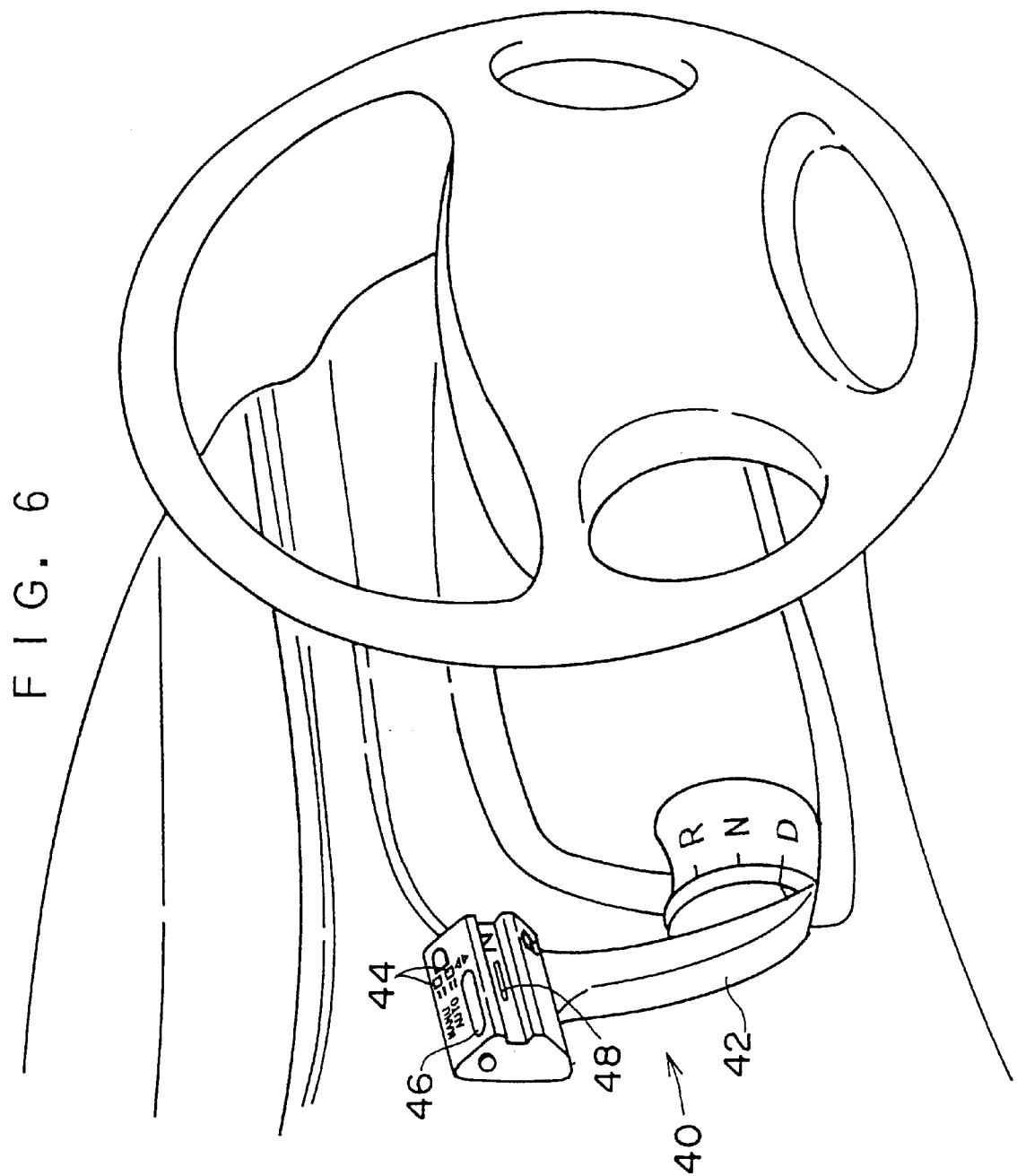
FIG. 6 is a perspective view showing a modified example of the second embodiment of an input device for use in a vehicle for inputting settings pertaining to a driver's intention of acceleration and deceleration according to the present invention.

In the above-described second embodiment, the shift switch 32 of the input device 30 for inputting settings pertaining to an intention of acceleration and deceleration is formed as a grip knob-type switch which allows selection of each shift position by the rotating operation thereof, but it can be formed as a lever-type switch. That is, as in an input device 40 of an intention of acceleration and deceleration shown in FIG. 6, there may be provided a structure in which a lever-type shift switch 42 provided in a region of a steering column is rotated in forward and rearward directions of the vehicle so as to allow selection of each of the forward shift position (D position), neutral or parking shift position (N/P position), and rearward shift position (R position).

In this case as well, the running mode selection switch 44 and the acceleration/deceleration switch 46 provided in the input device 40 of an intention of acceleration and deceleration are formed integrally with the shift switch 42 at a position in which they are visually recognizable only when the shift switch 42 is selected at the forward shift position (D position). An ignition switch 48 is formed integrally with the shift switch 42 at a position in which the ignition switch is visually recognizable only when the shift switch 42 is selected at the neutral or parking position (N/P position).

As a result, a function which is operable at a present shift position is recognizable based on a determination as to whether the above-described operation switches (the running mode selection switch 44 and the acceleration/deceleration switch 46, or the ignition switch 48) is visually recognizable. The function which is operable at the present time (that is, an operation switch corresponding thereto) is clearly recognizable and is understandable, and therefore, the driver becomes easily accustomed to use the device.

Figure 7:
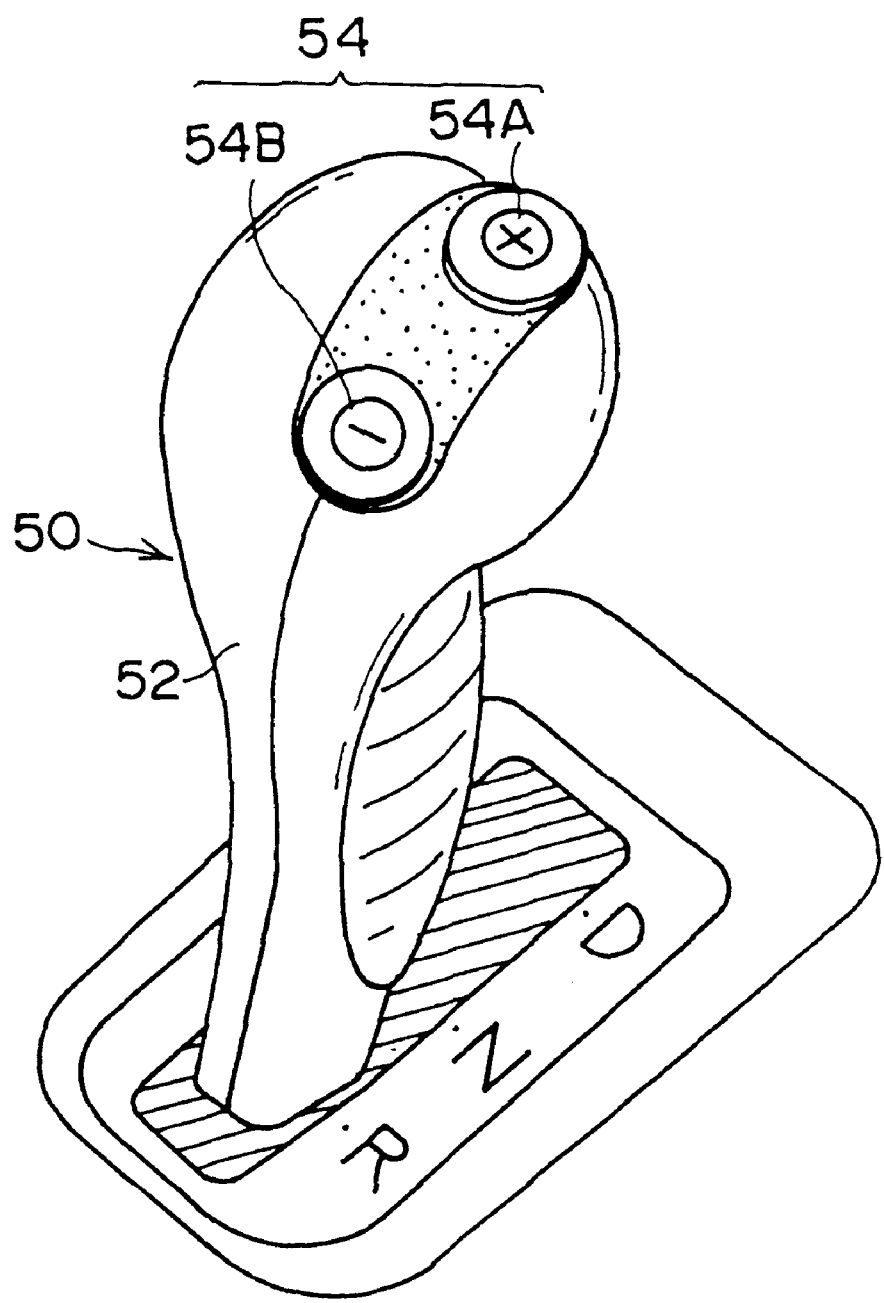
FIG. 7 is a perspective view showing overall construction of a third embodiment of an input device for use in a vehicle for inputting settings pertaining to a driver's intention of acceleration and deceleration according to the present invention.

Next, FIG. 7 is a perspective view of overall construction of a third embodiment of an input device 50 for inputting settings pertaining to an intention of acceleration and deceleration according to the present invention.

The input device 50 for inputting settings pertaining to an intention of acceleration and deceleration includes a so-called floor-type shift lever 52. The shift lever 52 has a forward shift position (D position) for forward transmission setting, a neutral or parking shift position (N/P position), and a rearward shift position (R position) for reverse transmission setting. Each of the shift positions can be selected by operating the shift lever 52 in forward and rearward directions of the vehicle.

In this case, the forward shift position (D position) is set nearer the front side of the vehicle than the neutral or parking shift position (N/P position) and the rearward shift position (R position) is set nearer the rear side of the vehicle than the neutral or parking shift position (N/P position).

Further, the shift lever 52 is provided with an acceleration/deceleration button 54. The acceleration/deceleration button 54 includes an acceleration operating position 54A for operation of acceleration, and a deceleration operating position 54B for operation of deceleration. When the forward shift position (D position) is selected by the shift lever 52, a transmission gear can be selected.

In this case, the acceleration operating position 54A in the acceleration/deceleration button 54 is set near the front side of the vehicle and the deceleration operating position 54B is set near the rear side of the vehicle. That is, in order that an engine brake be applied by downshift, so long as the button at the rear side of the vehicle, that is, the deceleration operating position 54B is operated, downshift is performed, for example, "from fourth gear speed to third gear speed", or "from third gear speed to second gear speed". In order that the engine brake be released, so long as the button at the front side of the vehicle, that is, the acceleration operating position 54A is operated, shifting to a high gear is performed.

In the input device 50 for inputting settings pertaining to an intention of acceleration and deceleration having the above-described structure, due to the operation of the shift lever 52 in forward and rearward directions of the vehicle, the forward shift position (D position), neutral or parking shift position (N/P position), and rearward shift position (R position) can each be selected.

When the forward shift position (D position) is selected, a function required therein can be realized only by operation corresponding to an intention of "acceleration" or "deceleration" using the acceleration/deceleration button 54.

In the input device 50 for inputting settings pertaining to an intention of acceleration and deceleration, the forward shift position (D position) of the shift lever 52 is set nearer the front side of the vehicle than the neutral or parking shift position (N/P position) and the rearward shift position (R position) is set nearer the rear side of the vehicle than the neutral or parking shift position (N/P position). That is, the operating directions of the shift lever 52 corresponding to a driver's intention in regard to acceleration and deceleration (that is, a driver's decision to accelerate or decelerate, or run a vehicle at constant rate) becomes more reasonable so as to be suited for human perception and reaction, and the driver becomes easily accustomed to use the device.

Further, in the input device 50 for inputting settings pertaining to an intention of acceleration and deceleration, the acceleration operating position 54A for acceleration in the acceleration/deceleration button 54 is provided near the front side of the vehicle and the deceleration operating position 54B is provided near the rear side of the vehicle. That is, the operating directions of the acceleration/deceleration button 54 becomes more reasonable so as to be suited for human perception and reaction corresponding to driver's intention in regard to acceleration and deceleration (that is, a driver's decision to accelerate or decelerate, or run a vehicle at constant rate), and the driver becomes more easily accustomed to use the device.

Figure 8:
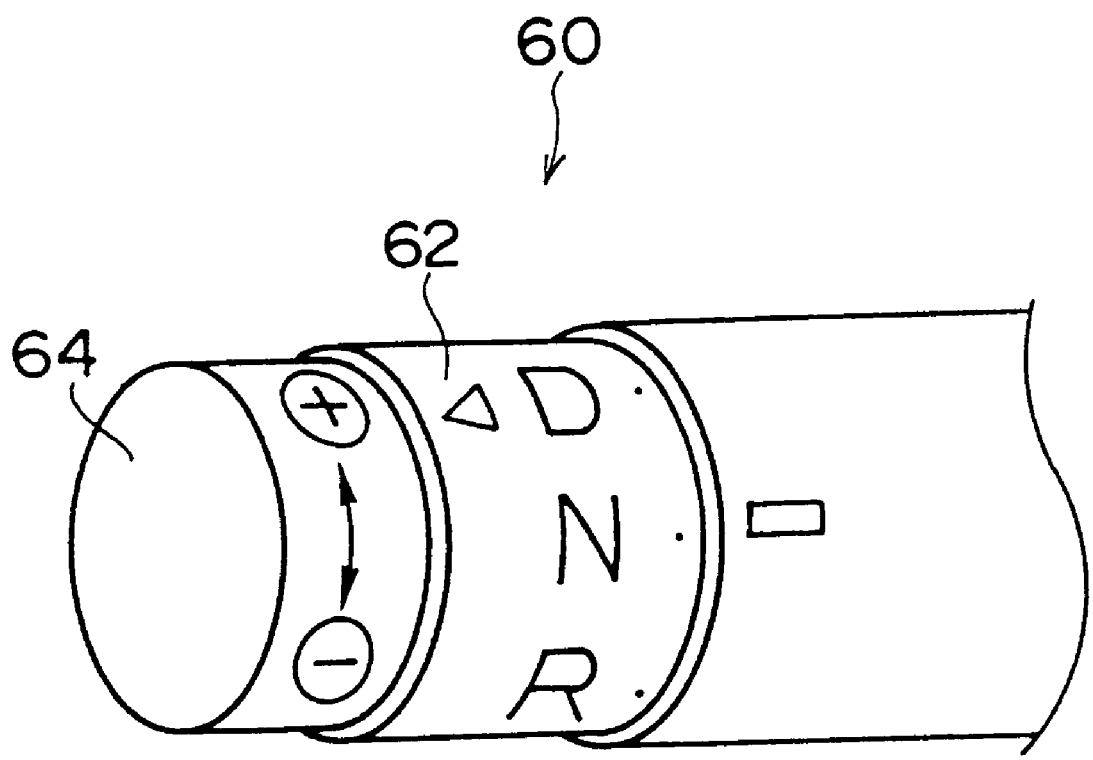
FIG. 8 is a perspective view showing a modified example of the input device for use in a vehicle for inputting settings pertaining to a driver's intention of acceleration and deceleration shown in FIG. 7.

In the above-described third embodiment, there is provided a structure in which the input device 50 for inputting settings pertaining to an intention of acceleration and deceleration includes the so-called floor type shift lever 52. However, the present invention is not limited to the same, and a structure equipped with a different type of shift lever may be applied. For example, as in an input device 60 of an intention of acceleration and deceleration shown in FIG. 8, there may be provided a structure in which with rotary type (so-called lever control-type) shift lever 62 and an acceleration/deceleration button 64 provided, each shift position is selected by a rotating operation of the shift lever 62 and an accelerating or decelerating operation is performed by rotating the acceleration/deceleration button 64.

In the rotary type shift lever as well, respective operating directions of the shift lever 62 and the acceleration/deceleration button 64, that is, forward and rearward rotating directions thereof) corresponding to a driver's intention in regard to acceleration and deceleration (that is, a driver's decision to accelerate or decelerate, or run a vehicle at constant rate) becomes more reasonable so as to be suited for human perception and reaction, and the driver becomes easily accustomed to use the device.

What is claimed is:

1. An input device for use in a vehicle for inputting settings pertaining to an intention of acceleration and deceleration, the input device comprising:
    a running mode selection switch for selecting any one of a manual speed change mode which allows manual shifting to a selected transmission gear, and a speed setting mode which allows cruising at a selected speed; and
    an acceleration/deceleration switch which is separate from said running mode switch which can select a transmission gear in the manual speed change mode and which allows acceleration and deceleration in the speed setting mode.

2. An input device for use in a vehicle for inputting settings pertaining to an intention of acceleration and deceleration according to claim 1, wherein an operating direction for acceleration in said acceleration/deceleration switch is set so as to be a forward direction of a vehicle in which said acceleration/deceleration switch is used and an operating direction for deceleration is set so as to be a rearward direction of the vehicle.

3. An input device for use in a vehicle for inputting settings pertaining to an intention of acceleration and deceleration according to claim 1, wherein said running mode selection switch includes a first switch in which the speed setting mode is selectively set, and a second switch in which the manual speed change mode is selectively set.

4. An input device for use in a vehicle for inputting settings pertaining to an intention of acceleration and deceleration according to claim 1, further comprising a speed setting switch formed integrally with said acceleration/deceleration switch and for setting a running speed of a vehicle.

5. An input device for use in a vehicle for inputting settings pertaining to an intention of acceleration and deceleration according to claim 1, wherein said running mode selection switch is formed integrally with said acceleration/deceleration switch.

6. An input device:for use in a vehicle for inputting settings pertaining to an intention of acceleration and deceleration according to claim 1, wherein said running mode selection switch is disposed in close vicinity to said acceleration/deceleration switch.

7. An input device for use in a vehicle for inputting settings pertaining to an intention of acceleration and deceleration according to claim 1, wherein said running mode selection switch is formed as a single switch in which any one of the manual speed change mode and the speed setting mode is selectively set by slide operation thereof.

8. An input device for use in a vehicle for inputting settings pertaining to an intention of acceleration and deceleration according to claim 2, wherein said running mode selection switch includes a first switch in which the speed setting mode is selectively set, and a second switch in which the manual speed change mode is selectively set.

9. An input device for use in a vehicle for inputting settings pertaining to an intention of acceleration and deceleration, the input device comprising:

a running mode selection switch for selecting any one of a manual speed change mode which allows manual shifting of a transmission gear, an automatic speed change mode which allows automatic shifting of a transmission gear, a speed setting mode which allows cruising while maintaining a selected speed, and a distance-between-cars setting mode which causes a vehicle to maintain a predefined distance from an adjacent car; and an acceleration/deceleration switch which is separate from said running mode selection switch in which a transmission gear can be selected in the manual speed change mode, a transmission shift pattern can be selected in the automatic speed change mode, acceleration and deceleration is possible in the speed setting mode, and the predefined distance from an adjacent car can be increased and decreased in the distance-between-cars setting mode, wherein said running mode selection switch and said acceleration/deceleration switch are disposed in close vicinity to each other.

10. An input device for use in a vehicle for inputting settings pertaining to an intention of acceleration and deceleration according to claim 9, wherein an operating direction for acceleration in said acceleration/deceleration switch is set so as to be a forward direction of a vehicle in which said acceleration/deceleration switch is used and an operating direction for deceleration is set so as to be a rearward direction of the vehicle.

11. An input device for use in a vehicle for inputting settings pertaining to an intention of acceleration and deceleration according to claim 9, further comprising a speed setting switch formed integrally with said acceleration/deceleration switch and for setting a running speed of a vehicle.

12. An input device for use in a vehicle for inputting settings pertaining to an intention of acceleration and deceleration according to claim 9, wherein said running mode selection switch is formed integrally with said acceleration/deceleration switch.

13. An input device for use in a vehicle for inputting settings pertaining to an intention of acceleration and deceleration according to claim 9, wherein said running mode selection switch is formed as a single switch in which the manual speed change mode, the automatic speed change mode, the speed setting mode, and the distance-between-cars mode are selectively set by slide operation of the switch.

14. An input device for use in a vehicle for inputting settings pertaining to an intention of acceleration and deceleration according to claim 9, wherein said running mode selection switch includes a first switch in which the speed setting mode and the distance-between-cars setting mode are selectively set, and a second switch in which the manual speed change mode and the automatic speed change mode are selectively set.

15. An input device for use in a vehicle for inputting settings pertaining to an intention of acceleration and deceleration, the input device comprising:

a shift switch in which a forward shift position for selecting a forward transmission setting, a rearward shift position for selecting a reverse transmission setting, and a neutral or parking shift position are provided;

a running mode selection switch for selecting any one of a manual speed change mode which allows manual shifting of a transmission gear, an automatic speed change mode which allows automatic shifting of a transmission gear, a speed setting mode which allows cruising while maintaining a selected speed, and a distance-between-cars setting mode which causes a vehicle to maintain a predefined distance from an adjacent car; and an acceleration/deceleration switch which is separate from said running mode selection switch in which a transmission gear can be selected in the manual speed change mode a transmission shift pattern can be selected in the automatic speed change mode, acceleration and deceleration is possible in the speed setting mode, and the predefined distance from an adjacent car can be increased and decreased in the distance-between-cars setting mode, wherein said running mode selection switch and said acceleration/deceleration switch are formed integrally with said shift switch and disposed in close vicinity to each other at a position in which said running mode selection switch and said acceleration/deceleration switch is visually recognizable only when said shift switch is selected at the forward shift position, and an ignition switch is formed integrally with said shift switch at a position in which the ignition switch is visually recognizable only when said shift switch is selected at the neutral or parking shift position.

16. An input device for use in a vehicle for inputting settings pertaining to an intention of acceleration and deceleration according to claim 15, wherein an operating direction for acceleration in said acceleration/deceleration switch is set so as to be a forward direction of a vehicle in which said acceleration/deceleration switch is used and an operating direction for deceleration is set so as to be a rearward direction of the vehicle.

17. An input device for use in a vehicle for inputting settings pertaining to an intention of acceleration and deceleration according to claim 15, wherein said shift switch is formed as a knob-type switch which selects each of the shift positions by rotating the shift switch.

18. An input device for use in a vehicle for inputting settings pertaining to an intention of acceleration and deceleration according to claim 15, wherein said shift switch is formed as a lever type switch which selects each of the shift positions by rotating the shift switch in forward and rearward directions of a vehicle.

* * * * *